(12) United States Patent
Pedersen et al.

(10) Patent No.: US 11,231,287 B2
(45) Date of Patent: Jan. 25, 2022

(54) AUTONOMOUS VEHICLE SERVICE SYSTEM

(71) Applicants: NISSAN NORTH AMERICA, INC., Franklin, TN (US); United States of America as Represented by the Administrator of the National Aeronautics and Space Administration, Washington, DC (US)

(72) Inventors: Liam Pedersen, San Francisco, CA (US); Siddharth Thakur, Fremont, CA (US); Armelle Guerin, Portola Valley, CA (US); Ali Mortazavi, Walnut Creek, CA (US); Atsuhide Kobashi, Mountain View, CA (US); Mauro Della Penna, San Francisco, CA (US); Richard Enlow, Alameda, CA (US); Andrea Angquist, Los Altos Hills, CA (US); Richard Salloum, San Mateo, CA (US); Stephen Wu, Menlo Park, CA (US); Ben Christel, Palo Alto, CA (US); Shane Hogan, Arlington, MA (US); John Deniston, Colorado Springs, CO (US); Jen Hamon, Palo Alto, CA (US); Sannidhi Jalukar, Mountain View, CA (US); Maarten Sierhuis, San Francisco, CA (US); Eric Schafer, Kentfiel, CA (US); David Lees, Palo Alto, CA (US); Dawn Wheeler, Mountain View, CA (US); Mark Allan, Campbell, CA (US)

(73) Assignees: NISSAN NORTH AMERICA, INC., Franklin, TN (US); United States of America as Represented by the Administrator of the National Aeronautics and Space, Washington, DC (US)

( * ) Notice: Subject to any disclaimer, the term of this patent is extended or adjusted under 35 U.S.C. 154(b) by 242 days.

(21) Appl. No.: 16/465,300

(22) PCT Filed: Dec. 22, 2017

(86) PCT No.: PCT/US2017/068248
§ 371 (c)(1),
(2) Date: May 30, 2019

(87) PCT Pub. No.: WO2018/119417
PCT Pub. Date: Jun. 28, 2018

(65) Prior Publication Data
US 2019/0376800 A1    Dec. 12, 2019

Related U.S. Application Data

(60) Provisional application No. 62/438,271, filed on Dec. 22, 2016.

(51) Int. Cl.
G01C 21/34    (2006.01)
G01C 21/36    (2006.01)
G05D 1/00     (2006.01)

(52) U.S. Cl.
CPC ..... G01C 21/3415 (2013.01); G01C 21/3667 (2013.01); G05D 1/0088 (2013.01); G05D 2201/0213 (2013.01)

(58) Field of Classification Search
CPC ........... G01C 21/3415; G01C 21/3667; G05D 1/0088; G05D 2201/0213; G05D 1/0011;
(Continued)

(56) References Cited

U.S. PATENT DOCUMENTS 6,208,932 B1 *  3/2001 Ohmura ............ G01C 21/3655
                                              701/538
8,718,861 B1 *  5/2014 Montemerlo ....... B60W 30/182
                                              701/26

(Continued)

FOREIGN PATENT DOCUMENTS

JP    2016095851 A    5/2016
JP    2016205980 A    12/2016
(Continued)

OTHER PUBLICATIONS

"Use of MOBITEX wireless wide area networks as a solution to land-based positioning and navigation;" Yang, T.T., Kai Yan Yip; Proceedings of 1994 IEEE Position, Location and Navigation Symposium—PLANS'94 (pp. 91-98); Jan. 1, 1994.*
(Continued)

Primary Examiner — Khoi H Tran
Assistant Examiner — Jorge O Peche
(74) Attorney, Agent, or Firm — Global IP Counselors, LLP

(57) ABSTRACT

An autonomous vehicle service system having a display device, a receiver, and a controller. The receiver is config-
(Continued)

ured to receive transmitted data from an autonomous vehicle related to status of the autonomous vehicle and information from a third party related to road conditions. The controller is programmed to monitor the transmitted data related to the status of the autonomous vehicle and the road conditions, determine when the autonomous vehicle requires assistance based on the transmitted data, and, when the autonomous vehicle requires assistance, cause information related to the autonomous vehicle to be displayed on the display device.

15 Claims, 7 Drawing Sheets

(58) Field of Classification Search
CPC ....... G08G 1/096822; G08G 1/096844; G08G 1/0969; G08G 1/20
See application file for complete search history.

(56) References Cited

U.S. PATENT DOCUMENTS

| | | | | |
|---|---|---|---|---|
| 9,282,430 | B1* | 3/2016 | Brandmaier | G06Q 10/06 |
| 9,286,628 | B2* | 3/2016 | Leopold | G08G 1/0137 |
| 9,305,407 | B1* | 4/2016 | Walton | G07C 5/08 |
| 9,349,291 | B2* | 5/2016 | Goudy | G08G 1/164 |
| 9,760,846 | B1* | 9/2017 | Brandmaier | G06Q 10/06 |
| 10,156,848 | B1* | 12/2018 | Konrardy | G07C 5/006 |
| 10,373,396 | B2* | 8/2019 | Tomer | G07B 15/00 |
| 10,377,374 | B1* | 8/2019 | Droz | B60W 30/09 |
| 10,504,094 | B1* | 12/2019 | Gaudin | G06Q 20/36 |
| 10,761,542 | B1* | 9/2020 | Fairfield | H04W 4/44 |
| 10,884,408 | B2* | 1/2021 | Uno | B60W 30/082 |
| 2004/0210358 | A1* | 10/2004 | Suzuki | G08G 1/0962 |
| | | | | 701/23 |
| 2011/0063129 | A1* | 3/2011 | Stahlin | G08G 1/164 |
| | | | | 340/905 |
| 2011/0224844 | A1* | 9/2011 | Farwell | G05D 1/0295 |
| | | | | 701/2 |
| 2012/0109409 | A1* | 5/2012 | Hara | B60L 3/12 |
| | | | | 701/1 |
| 2013/0325325 | A1* | 12/2013 | Djugash | G08G 1/0129 |
| | | | | 701/425 |
| 2014/0309815 | A1* | 10/2014 | Ricci | B60R 25/20 |
| | | | | 701/2 |
| 2015/0127191 | A1* | 5/2015 | Misra | G08G 1/143 |
| | | | | 701/1 |
| 2015/0291216 | A1* | 10/2015 | Sato | B62D 15/0265 |
| | | | | 701/23 |
| 2016/0090039 | A1* | 3/2016 | Tan | G08G 1/096741 |
| | | | | 348/148 |
| 2016/0092962 | A1* | 3/2016 | Wasserman | H04W 4/40 |
| | | | | 705/26.7 |
| 2016/0139594 | A1* | 5/2016 | Okumura | B60W 30/00 |
| | | | | 701/2 |
| 2016/0203560 | A1* | 7/2016 | Parameshwaran | G06Q 30/0218 |
| | | | | 705/4 |
| 2016/0207413 | A1* | 7/2016 | Atluri | H02J 7/00047 |
| 2016/0280224 | A1* | 9/2016 | Tatourian | B60W 30/143 |
| 2016/0305794 | A1* | 10/2016 | Horita | G06K 9/00825 |
| 2016/0334229 | A1* | 11/2016 | Ross | G08G 1/161 |
| 2017/0008521 | A1* | 1/2017 | Braunstein | B62D 15/025 |
| 2017/0052540 | A1* | 2/2017 | Lokesh | B60W 30/16 |
| 2018/0025235 | A1* | 1/2018 | Fridman | G06T 7/11 |
| | | | | 382/103 |
| 2018/0088571 | A1* | 3/2018 | Weinstein-Raun | G05D 1/0287 |
| 2018/0136655 | A1* | 5/2018 | Kim | G05D 1/0011 |
| 2018/0151066 | A1* | 5/2018 | Oba | G01C 21/3407 |
| 2018/0211546 | A1* | 7/2018 | Smartt | G05D 1/0088 |
| 2018/0225975 | A1* | 8/2018 | Park | G08G 1/052 |
| 2018/0299884 | A1* | 10/2018 | Morita | G07C 5/0816 |
| 2018/0329418 | A1* | 11/2018 | Baalke | G05D 1/0246 |
| 2018/0345963 | A1* | 12/2018 | Maura | G05D 1/0223 |
| 2018/0348791 | A1* | 12/2018 | Hendrickson | G05D 1/0293 |
| 2019/0001977 | A1* | 1/2019 | Lin | B60W 30/143 |
| 2019/0019349 | A1* | 1/2019 | Dolgov | G07C 5/008 |
| 2019/0088135 | A1* | 3/2019 | Do | G05D 1/0055 |
| 2019/0147252 | A1* | 5/2019 | Sawada | G06K 9/00791 |
| | | | | 348/148 |
| 2019/0156664 | A1* | 5/2019 | Yamada | G08G 1/0112 |
| 2019/0206149 | A1* | 7/2019 | Sakurada | G07C 5/0825 |
| 2019/0217850 | A1* | 7/2019 | Kai | B60W 20/12 |
| 2019/0259286 | A1* | 8/2019 | Kim | G08G 1/0968 |
| 2019/0272760 | A1* | 9/2019 | McQuillen | G08G 1/0968 |
| 2019/0276029 | A1* | 9/2019 | Umeda | G06K 9/00805 |
| 2019/0283741 | A1* | 9/2019 | Toda | B60W 10/184 |
| 2019/0369644 | A1* | 12/2019 | Goudy | G05D 1/0027 |
| 2019/0391582 | A1* | 12/2019 | Jung | B60Q 1/525 |
| 2020/0070828 | A1* | 3/2020 | Okuda | G08G 1/09 |
| 2020/0132011 | A1* | 4/2020 | Kitagawa | F02D 29/02 |
| 2020/0394913 | A1* | 12/2020 | Reaser | G08G 1/144 |
| 2021/0070293 | A1* | 3/2021 | Arai | B60W 30/18018 |
| 2021/0081908 | A1* | 3/2021 | Derouen | G06Q 10/02 |

FOREIGN PATENT DOCUMENTS

| | | | |
|---|---|---|---|
| WO | WO 2020/139714 A1 * | 7/2020 | |
| WO | WO 2020/154676 A1 * | 7/2020 | |

OTHER PUBLICATIONS

"System architecture for autonomous driving with infrasturcture sensors;" Kyung-Bok Sung, Dong-yong Kwak; 2012 6th International Conference on Signal Processing and Communication Systems (pp. 1-6); Apr. 24, 2013.*
Extended Search Report in the corresponding European Patent Application No. 17883802.5 dated Dec. 9, 2019.

* cited by examiner

AUTONOMOUS VEHICLE SERVICE SYSTEM

CROSS-REFERENCE TO RELATED APPLICATIONS

This application is a U.S. National Stage application of International Application No. PCT/US2017/068248, filed Dec. 22, 2017, which claims priority to U.S. Provisional Application No. 62/438,271, filed Dec. 22, 2016, the contents of each of which are hereby incorporated herein by reference.

BACKGROUND

Field of the Invention

The present invention generally relates to an autonomous vehicle service system. More specifically, the present invention relates to an autonomous vehicle service system capable of rendering assistance to an autonomous vehicle based on information related to the status of the autonomous vehicle.

Background Information

An autonomous vehicle can be controlled autonomously, without direct human intervention, to traverse a route of travel from an origin to a destination. An autonomous vehicle can include a control system that may generate and maintain the route of travel and may control the autonomous vehicle to traverse the route of travel.

SUMMARY

It has been discovered that autonomous vehicles can encounter a traffic situation that is counter to the programming of the vehicle. In such a situation, it may be advantageous to have a human intervene in the routing of the autonomous vehicle.

In view of the state of the known technology, one aspect of the present invention includes an autonomous vehicle service system having a display device, a receiver, and a controller. The receiver is configured to receive transmitted data from an autonomous vehicle related to status of the autonomous vehicle and information from a third party related to road conditions. The controller is programmed to monitor the transmitted data related to the status of the autonomous vehicle and the road conditions, determine when the autonomous vehicle requires assistance based on the transmitted data, and, when the autonomous vehicle requires assistance, cause information related to the autonomous vehicle to be displayed on the display device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
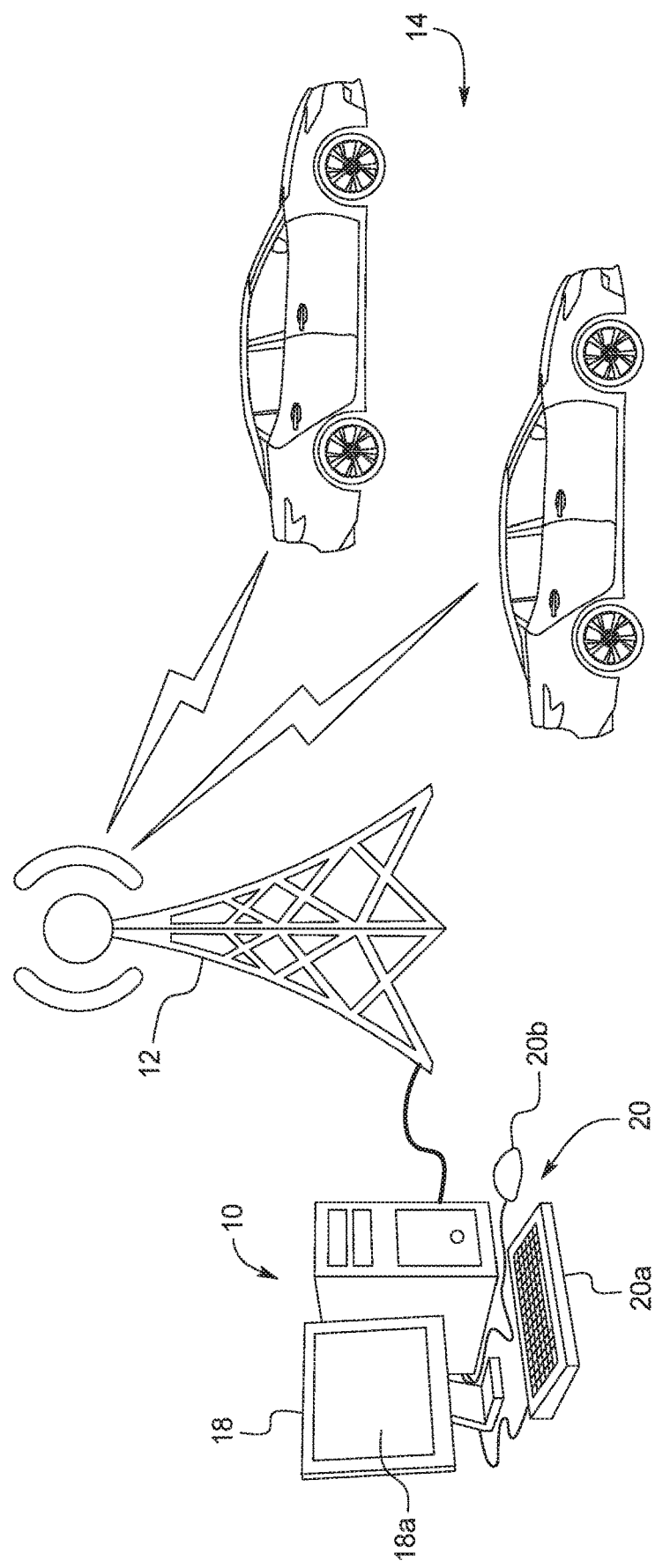
FIG. 1 is a schematic view of a plurality of autonomous vehicles communicating with an autonomous vehicle service system.
Figure 2:
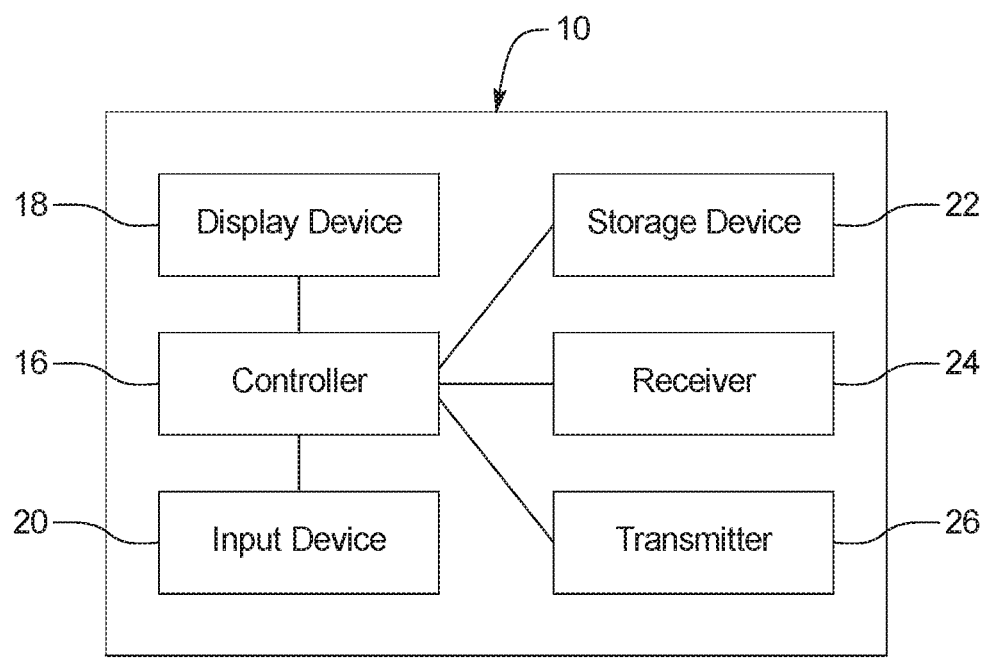
FIG. 2 is a schematic of the autonomous vehicle service system.

Referring initially to FIGS. 1 and 2, an autonomous vehicle service system 10 is illustrated in accordance with an embodiment. As shown in FIG. 1, the autonomous vehicle service system 10 can be in communication (wired or wireless) with an antenna 12 that transmits and receives information to and from a plurality of autonomous vehicles 14. Accordingly, the autonomous vehicle service system 10 can monitor the autonomous vehicles 14 to determine if there is a route issue, and update the autonomous vehicles 14 with information, including changes to the vehicle route.

As shown in FIG. 2, the autonomous vehicle service system 10 can include a controller 16, a display device 18, an input device 20, a storage device 22, a receiver 24 and a transmitter 26.

The controller 16 preferably includes a microcomputer with a control program that controls the autonomous vehicle service system 10 as discussed below. The controller 16 can also include other conventional components such as an input interface circuit, an output interface circuit, and storage devices such as a ROM (Read Only Memory) device and a RAM (Random Access Memory) device. The microcomputer of the controller 16 is programmed to control the autonomous vehicle service system 10. The memory circuit stores processing results and control programs such as ones for display device 18 and transmitter 26 operation that are run by the processor circuit. The controller 16 is operatively coupled to the display device 18, the input device 20, the storage device 22, the receiver 24 and the transmitter 26 in a conventional manner. The internal RAM of the controller 16 stores statuses of operational flags and various control data. The controller 16 is capable of selectively controlling any of the components of the autonomous vehicle service system 10 in accordance with the control program. It will be apparent to those skilled in the art from this disclosure that the precise structure and algorithms for the controller 16 can be any combination of hardware and software that will carry out the functions of the present invention.

The display device 18 can be any device capable of or configured to visual display date in any manner desired. For example, the display device 18 can be computer screen 18a as is known in the art. The input device 20 can be any suitable input device 20 that enables a user to input data or commands into the autonomous vehicle service system 10. For example, the input device 20 can be a keyboard 20a, a mouse 20b, a microphone, or any other suitable device.

The receiver 24 and the transmitter 26 can capable of receiving and transmitting data to and from the autonomous vehicle service system 10. For example, the receiver 24 is capable of receiving information (data) from a plurality of autonomous vehicles 14 and communicate the received data to the controller 16, which in turn is capable of having the information displayed on the display device 18. Additionally, the transmitter 26 is capable of having data input into the autonomous vehicle service system 10 transmitted to one or a plurality of the autonomous vehicles 14.

The storage device 22 can be any type of storage device that enables data to be stored therein and retrieved therefrom.

Figure 3:
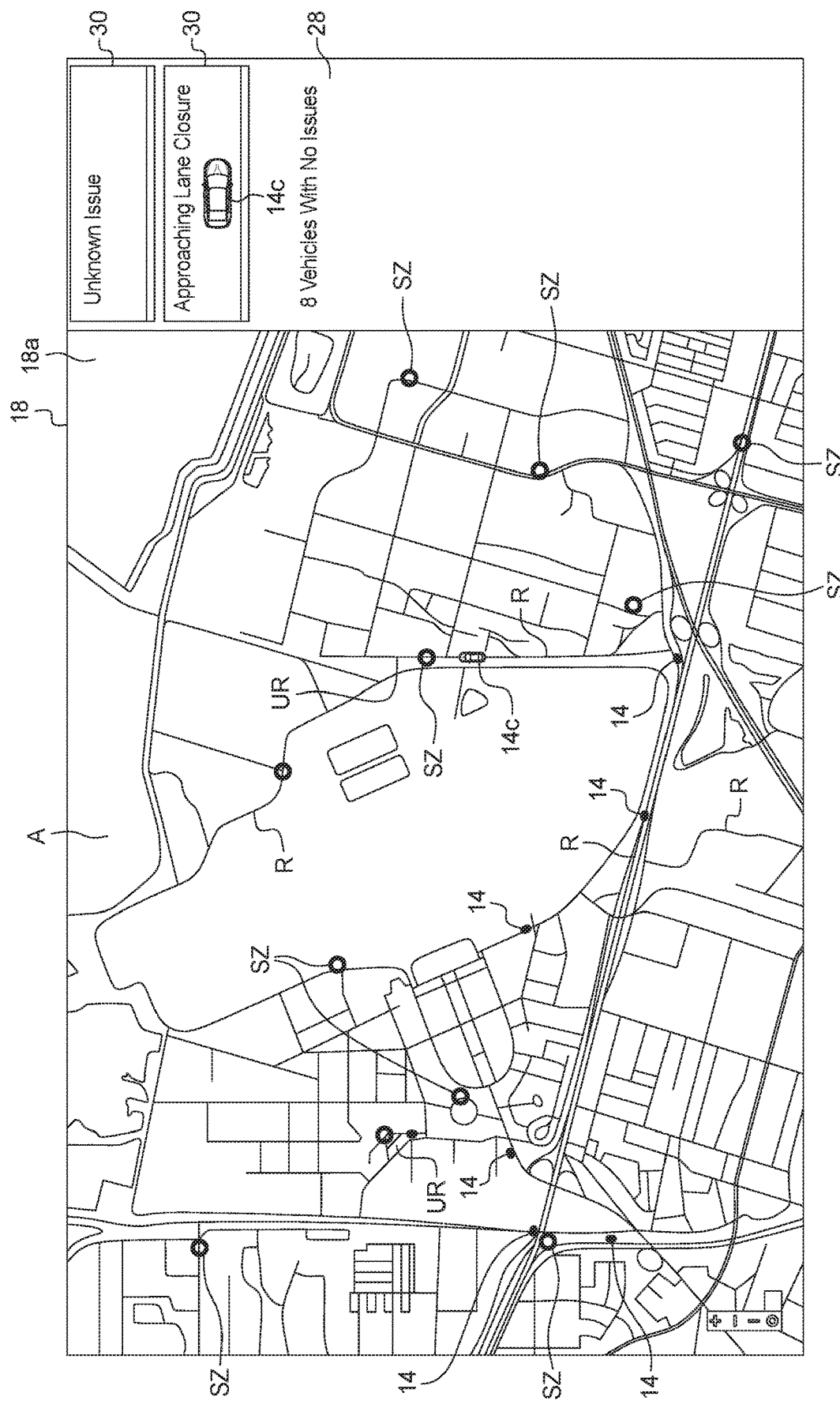
FIG. 3 is a visual display on a terminal of the autonomous vehicle service system showing a map area.

FIG. 3 illustrates an exemplary display on the display device 18. In this example, the display device 18 is displaying a map of an area A including a plurality of autonomous vehicles 14. The map includes roads R and supervision zones SZ. Moreover, the display device 18 can include a vehicle information display area 28. In the vehicle information display area 28, the status of one or a multiple of vehicles 14 can be displayed in a ticket 30 that enables a user or operate to determine the status of an autonomous vehicle 14. In one embodiment, the ticket can be color coded relative to the autonomous vehicle 14. For example, the top ticket 30 can be red, and simultaneously, the autonomous vehicle to which the top ticket 30 pertains is colored red. However, it is noted that the tickets 30 can be linked or inedited with a respective autonomous vehicle 14 in any desired manner.

Each autonomous vehicle 14 has its respective information displayed in a respective ticket 30 or individualized area, so that the operator can determine whether a particular autonomous vehicle needs attention. The autonomous vehicle service system 10 can prioritize the tickets 30 based on the time the autonomous vehicle 14 has been waiting for attention or based on any other criteria.

The ticket 30 can display an issue an autonomous vehicle 14 is having with its particular route. For example, one autonomous vehicle 14c can encounter a super vision zone $SZ_1$ that is for example, a construction that closes a travel lane. In this embodiment, the autonomous vehicle can be labeled 14c on the map and the corresponding ticket can include the vehicle label. In the present situation, the road R can be reduced to one lane, with a signal person indicating when it is appropriate for one vehicle direction to proceed and one vehicle direction to stop, see for example FIG. 4. Moreover, here one vehicle direction is required to cross over a double yellow line or some other road indicator. In such a situation, the autonomous vehicle programming may make it difficult or impossible to proceed without human intervention.

Figure 4:
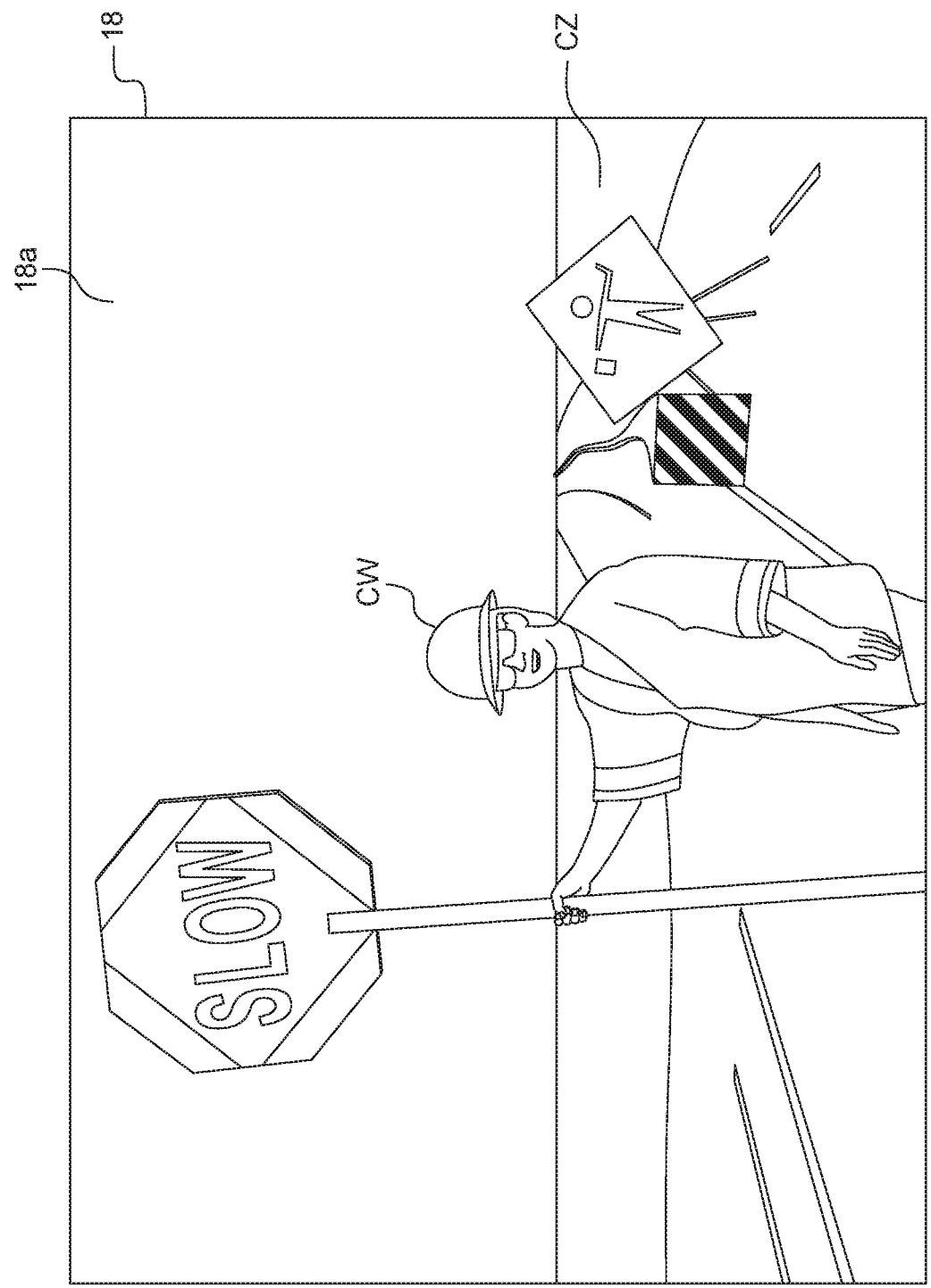
FIG. 4 is a visual display on a terminal of the autonomous vehicle service system showing a view from the autonomous vehicle.

Thus, if an operator is in the vehicle 14c, the operator is capable of overriding the autonomous vehicle 14c programming and enable the autonomous vehicle 14c to proceed. However, if no operator is on board, remote operator intervention may be necessary. In this embodiment, the remote operator can access the autonomous vehicle sensor system to determine the issue the autonomous vehicle. As shown in FIG. 4 for example, the operator can access the autonomous vehicle's camera system to determine that a lane closure has occurred. FIG. 4 illustrates a real time camera view from the autonomous vehicle 14c on the display device 18. That is, the receiver 24 is configured to receive an image transmitted by a camera on the autonomous vehicle 14c, and the display device 18 is configured to display the image.

As shown in in FIG. 4, the vehicle 14c is approaching the construction zone CZ in which a construction worker CW is informing the autonomous vehicle 14c to proceed slowly into the oncoming lane. Accordingly, the operator can reroute the autonomous vehicle 14c to an updated route UR (FIG. 3) that enables autonomous vehicle 14c to proceed into the oncoming lane when appropriately indicated by the construction worker CW. The controller 16 is programmed to cause the display device 18 to display the updated route UR (i.e., the route update), as illustrated in FIG. 3. It is noted that the operator instructions do not necessarily override the vehicle's programming regarding system and navigation, the rerouting can merely provide a rerouting of the updated route UR. The updated route UR then travels along the updated route UR after determining there are no other obstacles or oncoming vehicles. However, in some situations the operator can operate or instruct the autonomous vehicle 14c (or any autonomous vehicle 14) to perform acts otherwise contrary to the vehicle's programming.

The process of receiving information from an autonomous vehicle 14 and displaying the information of the display device 18 to enable an operator to update the autonomous vehicles route will now be discussed. First, a plurality of autonomous vehicles 14 transmit data. The autonomous vehicles 14 can continually (or at predetermined intervals) transmit data to enable continuous monitoring of the autonomous vehicles 14 by the autonomous vehicle service system 10. That is, the vehicles can transmit data that is displayed on the display device 18 that enables an operator to continually monitor the vehicles speed, direction and location. The vehicle information can also include additional data, including but not limited to vehicle destination, vehicle occupancy or any other suitable information.

In one embodiment, the transmitted vehicle information can include a request for assistance in predetermined situations. For example, when one of the autonomous vehicles 14 is in a situation in which it is not able to proceed, after a predetermined amount of time, the autonomous vehicle 14 can transmit a request for assistance to solve the issue at hand. That is, as discussed above, if the autonomous vehicle 14 is stopped for a predetermined amount of time at a lane closure, the autonomous vehicle 14 can transmit a request for assistance.

Figure 5:
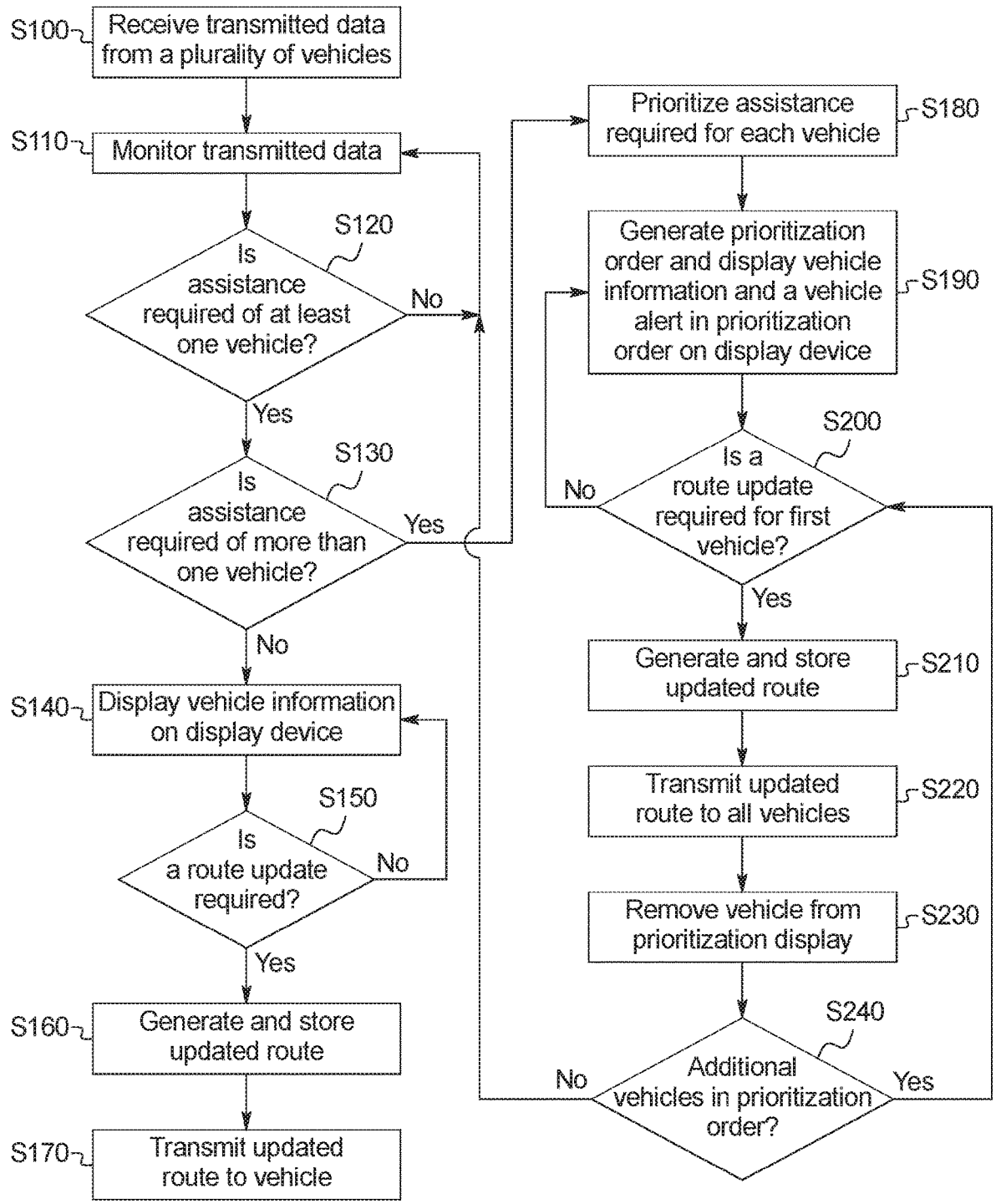
FIG. 5 is a flow chart illustrating the procedure of the autonomous vehicle service system to update a route of an autonomous vehicle.

As shown in FIG. 5, in step S100, this data (e.g., vehicle status information) is received by the receiver 24 of the autonomous vehicle service system 10. As stated above, the transmitted data can include a request for assistance. The controller 16 monitors the transmitted data in step S110 and determines whether assistance of at least one autonomous vehicle 14 is required is step S120. If no assistance is required, the controller 16 continues to monitor the transmitted data.

When at least one autonomous vehicle 14 requires assistance, the controller 16 determines if more than one autonomous vehicle 14 requires assistance in step S130. When only one autonomous vehicle 14 requires assistance, the vehicle information is displayed in a ticket 30 on the display device 18 in step S140. In other words, the controller 16 is programmed to monitor the transmitted data related to the status of the autonomous vehicle 14, determine when the autonomous vehicle 14 requires assistance based on the transmitted data, and, when the autonomous vehicle 14 requires assistance, cause information related to the autonomous vehicle to be displayed on the display device 18. Once the vehicle information is displayed, the operator can determine whether the vehicle requires assistance. For example, as stated above, the autonomous vehicle 14 can be in a situation in which there is a lane closure and the operator needs to generate a new route. Thus, in step S150 the operator can determined whether a new (updated) route is required. When a new (or updated) route is not required, the vehicle information can be continually displayed until removed by the operator, controller 16 or the autonomous vehicle 14.

When it is determined that a new (or updated) route is required, an updated route UR is generated and stored in the storage device 22 in step S160. In one embodiment, the operator can manually generate the updated route UR using the user input device 20 based on the vehicle information and the map display. That is, the operate can draw or create the updated route UR that enables the autonomous vehicle to cross into the oncoming traffic lane once the signal person indicates that it is safe to travel. Alternatively, the controller 16 can generate the updated route UR based on the information from the autonomous vehicle 14 and the displayed map data. The updated route UR is then transmitted via the transmitter 26 to the autonomous vehicle 14 in step S170. The updated route UR enables the autonomous vehicle 14 to proceed in a safe manner.

Returning to S130, when it is determined that more than one autonomous vehicle 14 needs assistance, the controller 16 prioritizes the assistance for each autonomous vehicle 14 in step S180. The prioritization can be based on time the autonomous vehicle 14 has been stopped, the time since the vehicle has requested assistance, or any other suitable criteria. For example, in some situations, a vehicle emergency may enable a vehicle higher prioritization. Thus, the controller 16 is programmed to monitor transmitted data related to status of each of the plurality of autonomous vehicles 14, and determine when each of the plurality of autonomous vehicles requires assistance based on the transmitted data from the autonomous vehicles 14, prioritize the assistance needed for each of the autonomous vehicles 14, and cause the display device to display an order of prioritization of the autonomous vehicles.

In step S190, the controller 16 then generates a prioritization order and displays the vehicle information and a vehicle alert for each vehicle in the prioritization order on the display device 18. The controller 16 is programmed to cause an alert A (such as, approaching lane closure) related to the autonomous vehicle to be displayed on the display device. Such an alert A can gain the attention of the operator and enable the operator to understand the issue presented to the autonomous vehicle 14.

Thus, the controller 16 is programmed to monitor transmitted data related to status of each of the plurality of autonomous vehicles 14, and determine when each of the plurality of autonomous vehicles requires assistance based on the transmitted data from the autonomous vehicles 14, prioritize the assistance needed for each of the autonomous vehicles 14, and cause the display device 18 to display an order of prioritization of the autonomous vehicles. Moreover, as shown in FIG. 3, the controller 16 is programmed to cause information (ticket 30) related to the autonomous vehicle 14 to be displayed on the display device 18, simultaneously with the location of the autonomous vehicle 14 on a map.

As illustrated in FIG. 3, the prioritization order can be displayed using a ticket 30 in the vehicle information area of the display device 18 for each of the autonomous vehicles 14. Once the autonomous vehicle information is displayed, the operator can determine whether the first prioritized autonomous vehicle 14 requires assistance. For example, as stated above, the autonomous vehicle 14 can be in a situation in which there is a lane closure and the operator needs to generate an update or new route. Thus, in step S200 the operator can determined whether an updated or new route is required. When an update or new route is not required, the vehicle information can be continually displayed until removed by the operator, controller 16 or the autonomous vehicle 14. The operator can then move to the next vehicle in the prioritization order.

It is noted that in some embodiment, the autonomous vehicle 14 may require an updated route to move around a construction zone. However, the updated or new route can be any type of routing desired. For example, due to traffic or other situation, the updated route may be a rerouting on existing roads or traveling along roads not otherwise known to the autonomous vehicle 14.

When it is determined that a new route is required, an updated route UR is generated and stored in the storage device 22 in step S210. In one embodiment, the operator can manually generate the updated route UR based on the vehicle information and the map display. That is, the operate can draw or create an updated route UR that enables the autonomous vehicle 14 to cross into the oncoming traffic lane once the signal person indicates that it is safe to travel or enables the vehicle to pass along an area not otherwise considered a drivable road by the autonomous vehicle 14. Alternatively, the controller 16 can generate an updated route based on the information from the autonomous vehicle 14 (or other autonomous vehicles 14) and the displayed map data. The updated route UR is then transmitted via the transmitter 26 to the autonomous vehicle in step S220. The updated route UR enables the autonomous vehicle 14 to proceed in a safe manner. Since additional autonomous vehicles 14 may encounter this situation, the updated route UR can be transmitted to all autonomous vehicles 14 in the map area, or any suitable vehicles. In other words, the controller 16 is programmed to cause the transmitter 26 to transmit the updated route UR to another autonomous vehicle 14.

Once the autonomous vehicle 14 that has requested assistance has proceeded along the updated route UR and is no longer in need of assistance, the vehicle information can be removed from the display in step S230. Then, in step S240, in is determined whether additional autonomous vehicles 14 remain in the prioritization order—that is, whether additional autonomous vehicles 14 need assistance. If no other autonomous vehicles 14 need assistance, the controller 16 continues to monitor the transmitted data. When at least one additional autonomous vehicle 14 requires assistance, the process returns to step S200 to determine whether the next autonomous vehicle 14 requires an updated route.

Figure 6:
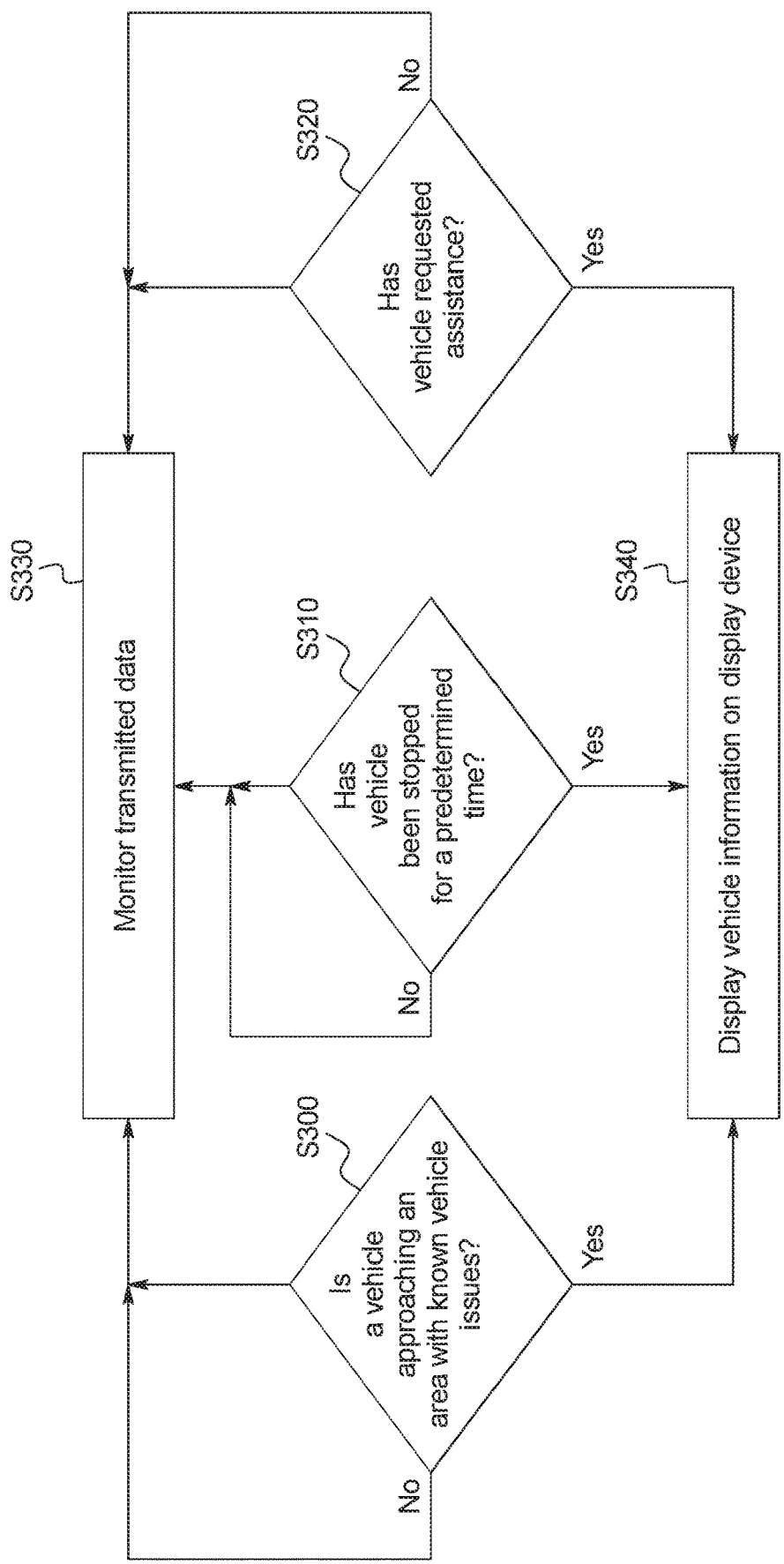
FIG. 6 is a flow chart illustrating the procedure to monitor and display autonomous vehicle information and status.

FIG. 6 illustrates an embodiment in which parallel decisions on whether the autonomous vehicle 14 requires assistance. That is, in Step S300, step S310 and step S320 the controller 16 can use any or all of the criteria to determine whether the autonomous vehicle 14 is in need assistance. In step S300, the autonomous vehicle service system 10 can monitor the vehicle information, and based on the autonomous vehicle 14 position and direction and/or destination, or any other suitable data, the controller 16 can determine whether the autonomous vehicle 14 will encounter a known supervision zone SZ. When the autonomous vehicle 14 is on a route or progressing to a destination that will not encounter a known issue (e.g., a known supervision zone SZ), the controller 16 can continue to monitor the transmitted data in step S330. However, when it is determined that the autonomous vehicle 14 will encounter a known issue, the controller 16 can display the vehicle information on the display device 18 to enable the operator to monitor the autonomous vehicle situation and provide an updated route to the autonomous vehicle 14 prior to the vehicle arriving at the known issue in step S340. Thus, the controller 16 is programmed to predict when the autonomous vehicle 14 requires assistance based on transmitted data from the autonomous vehicle 14.

In this embodiment, a known issue can be any situation, for example a supervision zone, as described herein, that will require intervention from an operator of the autonomous vehicle service system 10. Moreover, in one embodiment, the controller 16 can be programmed to automatically transmit the updated route the autonomous vehicle 14 via the transmitter 26 without the intervention of the operator. That is, the controller 16 can determine based on the information provided that the known issue still exists that that the operator has provided a satisfactory updated route. The controller 16 can transmit via the transmitter 26 this updated route to the autonomous vehicle.

In step S310, the controller 16 can monitor the transmitted data from the autonomous vehicles 14 and determine when the autonomous vehicle 14 has been stopped for a predetermined amount of time. Based on this predetermined amount of time, the controller 16 can determine that the autonomous vehicle 14 is in need of assistance. In other words, the controller 16 is programmed to determine that the autonomous vehicle 14 requires assistance when the autonomous vehicle 14 has been stopped for a predetermined amount of time. When the autonomous vehicle 14 has not been stopped for a predetermined amount of time, the controller 16 can continue to monitor the transmitted data in step S330. However, when the autonomous vehicle 14 has been stopped for a predetermined amount of time, the controller 16 can determine that the autonomous vehicle 14 is in need of assistance, and then display the vehicle information on the display device 18 to enable the operator to monitor the autonomous vehicle situation and provide an updated route to the autonomous vehicle 14, if necessary in step S340. In other words, the controller 16 is programmed to determine that the autonomous vehicle 14 requires assistance when the autonomous vehicle 14 has been stopped for a predetermined amount of time.

Alternatively, the controller 16 can automatically transmit via the transmitter 26 an updated route to the autonomous vehicle 14 if the autonomous vehicle 14 is encountering a known issue, as discussed above. Thus, in one embodiment, when the autonomous vehicle 14 encounters a known supervision zone SZ with a known updated route UR, the updated route UR can be automatically transmitted to the autonomous vehicle 14.

In step S320, the controller 16 can determine whether the autonomous vehicle 14 has requested assistance. When the vehicle has not requested assistance, the controller 16 can continue to monitor the transmitted data in step S330. However, when the autonomous vehicle 14 has requested assistance, the controller 16 can determine that the autonomous vehicle 14 is in need of assistance, and then display the vehicle information on the display device 18 to enable the operator to monitor the autonomous vehicle situation and provide an updated route to the autonomous vehicle 14, if necessary in step S340. In other words, the controller 16 is programmed to cause information related to the autonomous vehicle 14 to be displayed on the display device 18 based on a request from the autonomous vehicle.

Alternatively, the controller 16 can automatically transmit via the transmitter 26 an updated route to the autonomous vehicle 14 if the autonomous vehicle 14 encounters a known issue, as discussed above. Thus, in one embodiment, when the autonomous vehicle 14 encounters a known supervision zone with a known updated route, the updated route can be automatically transmitted to the autonomous vehicle 14.

The autonomous vehicle service system 10 described herein improves situations in which an autonomous vehicle 14 encounters a traffic situation that is counter to the programming of the autonomous vehicle 14. As described herein in can be advantageous to have a human operator or a controller 16 intervene in the routing of the autonomous vehicle 14.

Figure 7:
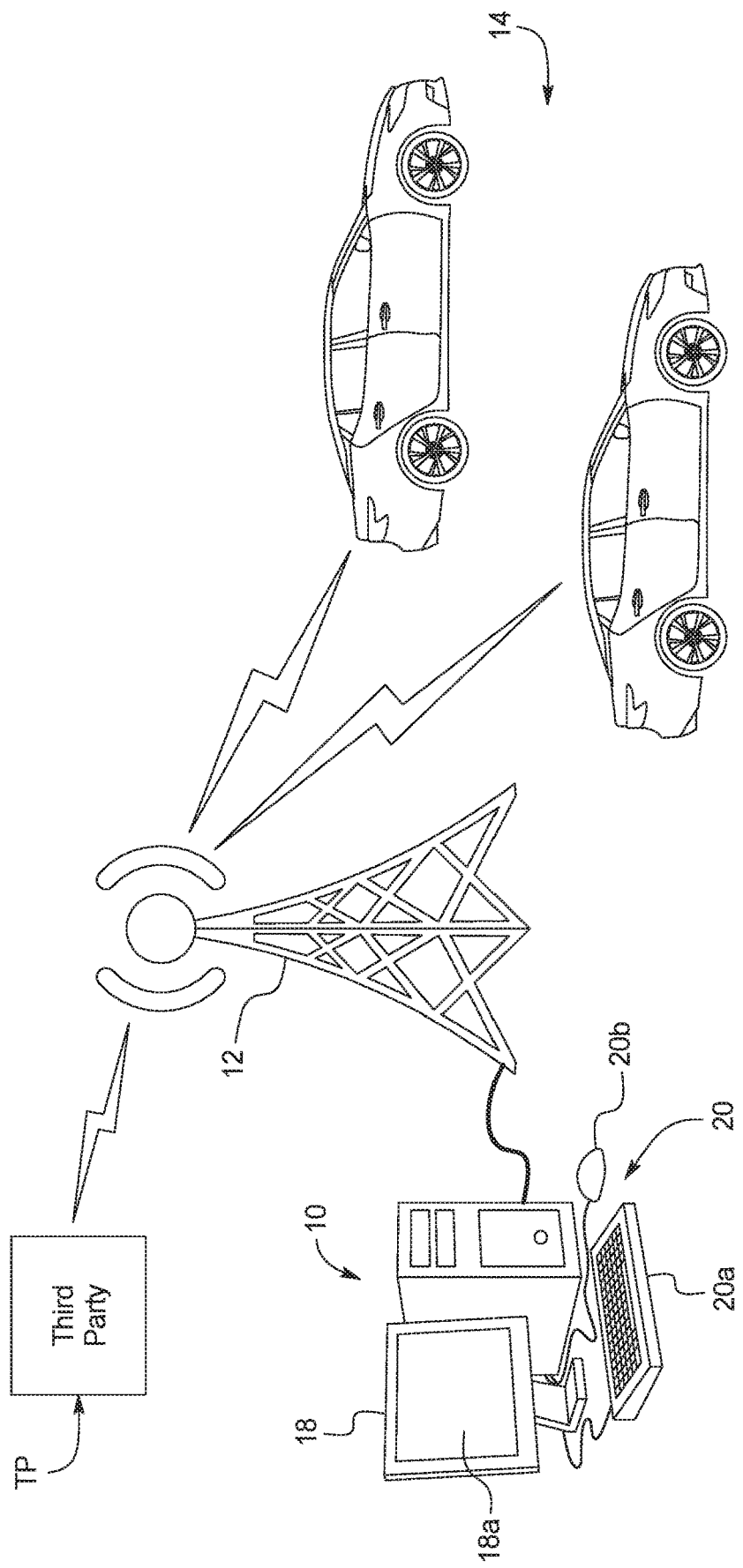
FIG. 7 is a schematic view of a plurality of autonomous vehicles and a third party communicating with an autonomous vehicle service system.

In one embodiment illustrated in FIG. 7, a third party TP is capable of interfacing with the autonomous vehicle service system 10. The third party TP can be remote from the autonomous vehicle service system 10 and access the autonomous vehicle service system 10 in any suitable manner. For example, the third party TP can access the autonomous vehicle service system 10 wireless through any suitable wireless network or system (cellular technology) or using wires through any network or system (e.g., the internet) or combination thereof. That is, the third party TP can access the autonomous vehicle service system 10 from any type of portable device or remote terminal or any other device.

In this embodiment, a third party TP, such as an emergency responder, public utility or any other suitable source can interface with the autonomous vehicle service system 10 by, for example, sending a signal that is received by the receiver. The controller 16 then enables the third party TP to control or access the autonomous vehicle service system 10 and create a supervision zone SZ. In this embodiment, when the third party TP knows that a traffic situation will occur that may require a route update, the third party TP can interface with the autonomous vehicle service system 10 can to provide supplemental or additional information on the display device 18 by generating a supervision zone SZ that will require an updated route UR, or simply provide an updated route UR. Moreover, the controller can then transmit the confirmation of the supervision zone SZ back to the third party TP. For example, an emergency responder may require a portion or an entire street to be shut down. Thus, the autonomous vehicle 14 would require an updated route UR.

In another embodiment, the third party TP may be an event or stadium official that requires streets to be closed during certain events close to the event. Moreover, the third party TP may understand that it would be advantageous for the autonomous vehicle 14 to simply avoid certain areas surrounding the event due to road closures or traffic, and thus the event or stadium official can create a supervision zone SZ and/or an updated route UR to avoid the supervision zone SZ.

The third party TP can set the supervision zone SZ to expire at a predetermined time or exist for a predetermined time to enable the autonomous vehicles to use the updated route UR for the predetermined time. Moreover, if desired, the third party TP can interface to close supervision zone SZ they created or any other supervision zone SZ, if desired.

In one embodiment, the third party TP can interface with the autonomous vehicle service system 10 for business proposes. That is, the third party TP can interface with the autonomous vehicle service system 10 so as to control one or more of the autonomous vehicles 14. Thus, the third party TP can utilize the one or more of the autonomous vehicles 14 for business purposes, such as delivery of items or movement of persons.

In this embodiment, with the agreement of the owner/operator of the autonomous vehicle service system 10, the third party TP can access control of one or more of the autonomous vehicles 14 temporarily, permanently or for a predetermined amount of time, direct one or more of the autonomous vehicles 14 to pick up a package or person through the autonomous vehicle service system 10 and delivery the package or person to a specific place.

In each of the third party TP applications, the third party TP can send and receive information regarding the supervision zone SZ, such that the third party is capable of monitoring the supervision zone SZ and changing, adding or removing the supervision zone SZ The display device 18, input device 20, storage device 22, receiver 24 and transmitter 26 are conventional components that are well known in the art. Since the display device 18, input device 20, storage device 22, receiver 24 and transmitter 26 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," or "element" when used in the singular can have the dual meaning of a single part or a plurality of parts. Accordingly, these terms, as utilized to describe the present invention should be interpreted relative to an autonomous vehicle service system.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An autonomous vehicle service system, comprising:
   a display device;
   a non-moveable receiver remote from an autonomous vehicle and configured to receive transmitted data from the autonomous vehicle related to status of the autonomous vehicle and information from a third party related to road conditions; and
   a controller programmed to monitor the transmitted data related to the status of the autonomous vehicle and the road conditions, determine when the autonomous vehicle requires assistance based on the transmitted data, and, when the autonomous vehicle requires assistance, cause information related to the autonomous vehicle to be displayed on the display device;
   wherein the autonomous vehicle is a first vehicle of a plurality of autonomous vehicles, and the controller is programmed to monitor transmitted data related to status of each of the plurality of autonomous vehicles, and determine when each of the plurality of autonomous vehicles requires assistance based on the transmitted data;
   wherein the controller being further programmed to prioritize the assistance required of each of the plurality of autonomous vehicles, and cause the display device to display an order of prioritization of the autonomous vehicles.

2. The autonomous vehicle service system of claim 1, wherein
   the controller is programmed to predict when the autonomous vehicle requires assistance based on the transmitted data.

3. The autonomous vehicle service system of claim 1, wherein
   the controller is programmed to predict when the autonomous vehicle requires assistance based on a route of the autonomous vehicle.

4. The autonomous vehicle service system of claim 1, wherein
   the controller is programmed to cause an alert related to the autonomous vehicle to be displayed on the display device.

5. The autonomous vehicle service system of claim 1, further comprising a transmitter configured to transmit a route update to the autonomous vehicle.

6. The autonomous vehicle service system of claim 5, further comprising a storage device configured to store the route update.

7. The autonomous vehicle service system of claim 5, wherein
   the controller is programmed to cause the display device to display the route update.

8. The autonomous vehicle service system of claim 5, wherein
   the controller is programmed to cause the transmitter to transmit the route update to another autonomous vehicle.

9. The autonomous vehicle service system of claim 5, further comprising a user input device configured to input information to create the route update.

10. The autonomous vehicle service system of claim 1, wherein
    the controller is programmed to cause information related to the autonomous vehicle to be displayed on the display device based on a request from the autonomous vehicle.

11. The autonomous vehicle service system of claim 1, wherein
the controller is programmed to determine that the autonomous vehicle requires assistance when the autonomous vehicle has been stopped for a predetermined amount of time.

12. The autonomous vehicle service system of claim 1, wherein
the controller is programmed to cause information related to the autonomous vehicle to be displayed on the display device, simultaneously with the location of the autonomous vehicle on a map.

13. The autonomous vehicle service system of claim 1, wherein
the receiver is configured to receive an image transmitted by a camera on the autonomous vehicle, and
the display device is configured to display the image.

14. The autonomous vehicle service system of claim 1, wherein
the controller is configured to update the road conditions based on updated road information received from the third party.

15. The autonomous vehicle service system of claim 1, wherein
the information related to the autonomous vehicle displayed in the information display area on the display device is displayed as a ticket that is color coded to match the autonomous vehicle displayed in the map on the display device.

\* \* \* \* \*